United States Patent [19]
Palmer et al.

[11] 4,234,788
[45] Nov. 18, 1980

[54] ELECTROSTATIC FIBER OPTIC SCANNING DEVICE

[75] Inventors: John P. Palmer, Pomona; Scott M. Rose, Mountain View, both of Calif.

[73] Assignee: General Dynamics Corporation, Pomona Division, Pomona, Calif.

[21] Appl. No.: 27,550

[22] Filed: Apr. 6, 1979

[51] Int. Cl.$^3$ ................................................ G02B 5/14
[52] U.S. Cl. .................................... 250/227; 358/200
[58] Field of Search ............... 358/200; 250/227, 234, 250/235, 236; 350/96.18

[56] References Cited

U.S. PATENT DOCUMENTS

| | | |
|---|---|---|
| 3,122,360 | 11/1963 | Gregg . |
| 3,401,232 | 9/1968 | Goldhammer et al. ............. 250/227 |
| 3,470,320 | 9/1969 | Pike et al. . |
| 3,530,258 | 9/1970 | Gregg et al. . |
| 3,602,640 | 8/1971 | Maillet et al. ......................... 358/200 |
| 3,941,927 | 3/1976 | Russell . |

*Primary Examiner*—David C. Nelms
*Attorney, Agent, or Firm*—Neil F. Martin; Edward B. Johnson

[57] ABSTRACT

Disclosed is an fiber optic scanning device that includes an optical fiber of predetermined length having one unsupported end for scanning, and having another end rigidly supported in a cantilevered fashion. The disclosed device operates to allow the movable end to be positioned with voltages that are substantially reduced over the prior art. To that end, an electrically conductive film lies on the fiber extending from the unsupported end to the supported end; and a transparent conductive plate lies in a plane perpendicular to the length of the fiber spaced apart from the unsupported end. This conductive plate forms a capacitance C with the conductive film. A voltage source V couples between the transparent conductive plate and the conductive film on the fiber to produce an electrostatic charge Q on the movable end of the fiber, where Q=VC. The movable end is positioned with a force F=QE by generating an electric field E transverse to the length of the fiber.

8 Claims, 3 Drawing Figures

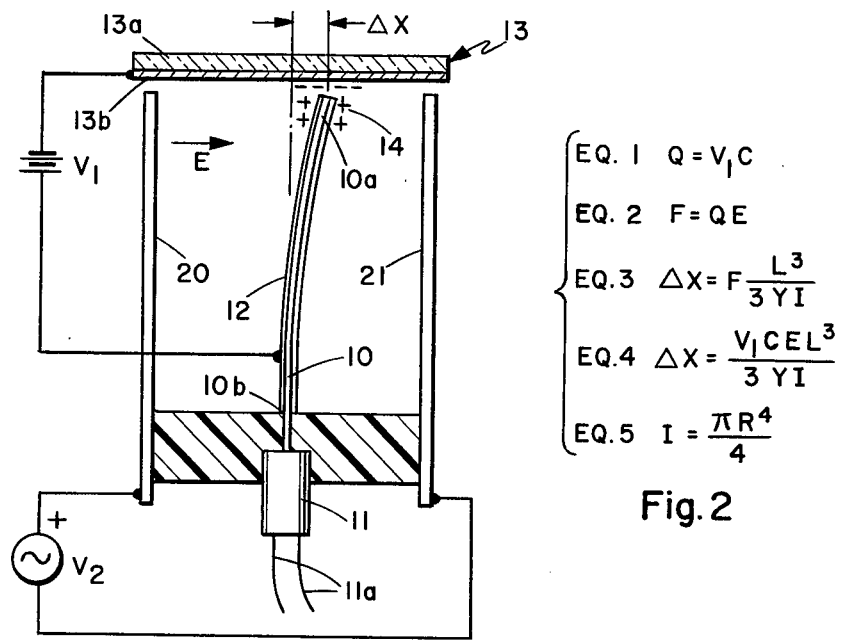
Fig. 1
$$\begin{cases} \text{EQ. 1} & Q = V_1 C \\ \text{EQ. 2} & F = QE \\ \text{EQ. 3} & \Delta X = F\dfrac{L^3}{3YI} \\ \text{EQ. 4} & \Delta X = \dfrac{V_1 CEL^3}{3YI} \\ \text{EQ. 5} & I = \dfrac{\pi R^4}{4} \end{cases}$$
Fig. 2
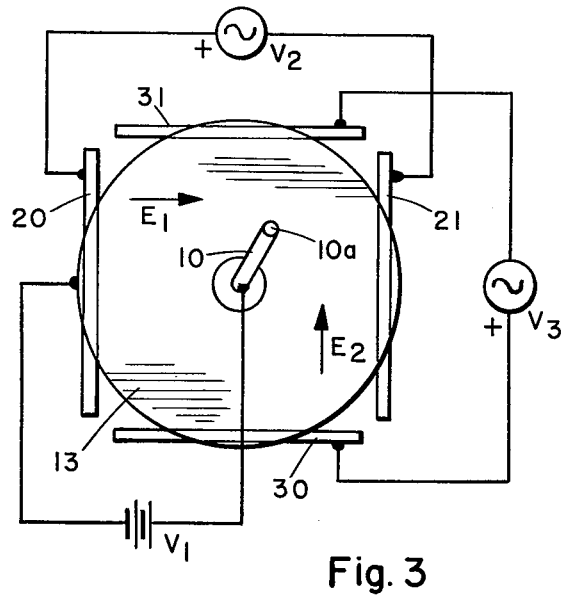
Fig. 3

ELECTROSTATIC FIBER OPTIC SCANNING DEVICE

BACKGROUND OF THE INVENTION

This invention relates to fiber optics, and more particularly to fiber optic scanning devices. Such devices typically include an optical fiber having one unsupported end for scanning, and having another end that is rigidly supported in a cantilevered fashion. In operation, the unsupported end is moved in a continuous scanning pattern, such as a raster. This movement is caused by coating the fiber with a conductor and placing it within a transverse electric field that is large enough to polarize the conductor. One such prior art device is described for example in U.S. Pat. No. 3,112,360 issued Nov. 26, 1963.

A problem with such prior art fiber optic scanning devices, however, is that they require excessively high voltages for their operation. Examples of these voltages are given in column 4 and column 6 of the above cited patent. There, voltages of 50,000 volts and a quarter million volts are described as being required to deflect the movable end of the optical fiber. Clearly, it is highly desirable to reduce these operating voltages. Not only are they dangerous, but they are difficult and costly to produce.

Thus, it is a primary object of the invention to provide an improved fiber optic scanning device wherein a given deflection of the unsupported end of the scanning optic fiber can be positioned with substantially reduced operating voltages.

SUMMARY OF THE INVENTION

These and other objects are accomplished in accordance with the invention by a fiber optic scanning device that includes an optical fiber having an unsupported end for scanning, and having another end rigidly supported in a cantilevered fashion. A conductive film is formed on the fiber that extends from the unsupported end to the supported end. Suitably, this film is formed by a vacuum deposition or sputtering technique. A transparent conductive plate lies in a plane perpendicular to the length of the fiber and spaced apart from the unsupported end. This conductive plate forms a capacitance C with the conductor on the movable end of the fiber. Suitably, the conductive plate includes a glass substrate with a transparent conductive film disposed thereon.

A voltage source V is coupled between the transparent conductive plate and the conductor on the fiber. This produces an electrostatic charge Q on the movable end of the fiber. The charge Q is given by the relationship $Q = VC$. An electric field E is then generated transverse to the length of the fiber to position the movable end with a force $F = QE$. Suitably, the electric field E is generated by a pair of spaced apart conductive plates lying parallel to the length of the fiber with the fiber lying therebetween. In this arrangement, E is equal to the voltage applied between the parallel plates divided by the distance between the plates. For a given deflection, the voltage between the parallel plates may be substantially reduced over that required in the prior art since the deflection is proportional to the force F, which in turn equals QE. And due to the capacitance C in this invention, the charge Q increases, thus allowing E to be reduced.

BRIEF DESCRIPTION OF THE DRAWINGS

Various preferred embodiments of the invention will best be understood by reference to the following detailed description when read in conjunction with the accompanying drawings wherein:

FIG. 1 is a schematic diagram of a fiber optic scanning device constructed according to the invention.

FIG. 2 is a set of equations describing the operation of the FIG. 1 embodiment.

FIG. 3 is a schematic diagram of another embodiment of a fiber optic scanning device constructed according to the invention.

DETAILED DESCRIPTION

Referring now to FIG. 1, there is illustrated a schematic diagram of a fiber optic scanning device that is constructed according to the invention. This device includes an optical fiber 10 of predetermined length. Fiber 10 has one unsupported end 10a that is used for scanning, and has another end 10b that is rigidly supported in a cantilevered fashion. End 10b is also optically coupled to either a light emitting diode or a photo diode. These are indicated via reference numeral 11. When device 11 is a light emitting diode, then electrical signals applied to leads 11a are converted to a beam of light representative of the signals. This light travels along fiber 10 to end 10a where it is displayed. Conversely, when device 11 is a photo diode, then an image projected onto end 10a travels along fiber 10 to the photo diode. There it is converted to an electrical signal on leads 11a representative of the image.

Also included in the FIG. 1 device is an electrically conductive means 12 that is rigidly attached to fiber 10 and runs the length thereof. Preferably, this electrically conductive means is a continuous metal film. The film may be formed by well known vacuum deposition or sputtering techniques. It is not necessary for this film to surround the fiber 10. For example, only 50% of the fiber need be coated. This can readily be achieved by placing the fiber in a deposition chamber.

The FIG. 1 embodiment also includes a transparent conductive plate 13 that lies in a plane perpendicular to the length of fiber 10, and is spaced apart from the unsupported end 10a. Preferably, plate 13 is comprised of an optically transparent substrate 13a, such as glass, which is covered by an optically transparent conductive film 13b. Suitably, film 13b consists of tin oxide. One commercial source for the transparent conductive plate 13 is the Corning Glass Works Company.

Plate 13, together with the conductive film 12 near end 10a, form a capacitor C. Charge is stored in this capacitor by connecting a voltage source V1 between film 13b and the conductive film on the fixed end 10b of fiber 10. This charge is indicated schematically in FIG. 1 via plus signs and minus signs in the vicinity of reference numeral 14. Equation 1 of FIG. 2 gives the mathematical relationship between the charge Q that is stored on tip 10a in response to the voltage V1 and the capacitor C. In that equation, a capacitance of 100 picofarads to 1000 picofarads can readily be achieved.

The FIG. 1 embodiment further includes a means for generating an electric field E transverse to the length of fiber 10. This electric field operates on the charge Q that is stored at end 10a to exert a force F thereon and thus position the movable end. This force is expressed mathematically in equation 2 of FIG. 2. As therein indicated, force F is directly proportional to charge Q;

and in this invention, charge Q is maximized by creating a capacitance between tip 10a and plate 13. This in turn permits a given force F to be achieved with an electric field E that is substantially less than that which is required in the prior art.

The electric field E is illustrated in FIG. 1 as being generated between the pair of conductive plates 20 and 21. A voltage source V2 is connected across these plates. In this arrangement, the magnitude of the electric field E is equal to the magnitude of the voltage source V2 divided by the distance between plates 20 and 21. Utilizing this arrangement, a given deflection $\Delta X$ may be achieved with a voltage source V2 that typically is descreased by a factor of a thousand over that which is required in the prior art. Thus, for example, if V2 must be 50 volts to produce a given deflection $\Delta X$ with V1 in place, then a voltage source V2 of 50,000 volts would typically be required to produce the same reflection with V1 removed.

Equations 3 through 5 of FIG. 2 describe the actual amount of deflection $\Delta X$ that will result for any given value of the voltage sources V1 and V2. In equation 3, the displacement $\Delta X$ is expressed in terms of the force F as given by equation 2, the length L of the optical fiber 10, the moment of inertia I of fiber 10, and Youngs modulus Y. Substitution of equations 1 and 2 into equation 3 yields equation 4. The parameter I in equation 4 is dependent upon the geometrical shape of fiber 10. Equation 5 gives an expression for I when fiber 10 is cylindrically shaped.

A modified version of the FIG. 1 embodiment is illustrated in FIG. 3. The FIG. 3 embodiment includes all of the components of the FIG. 1 embodiment; and in addition, it further includes another pair of spaced apart conductive plates 30 and 31. These plates are electrically coupled to another voltage source V3. In operation, electric fields E1 and E2 are generated perpendicular to the surfaces of plates 20 and 21, and 30 and 31 respectively. As a result, movable end 10a may be positioned in two dimensions. This follows by utilizing superposition of the above analysis. In this embodiment, both of the voltages V2 and V3 are substantially reduced over that required by prior art to achieve the same deflection.

Various embodiments of the invention have now been described in detail. In addition, many changes and modifications can be made thereto without departing from the nature and spirit of the invention. Thus, it is to be understood that the invention is not limited to said details but is defined by the appended claims.

Having described our invention, we now claim:

1. A fiber optic scanning device with improved electrostatic positioning comprising:
   an optical fiber of predetermined length having one unsupported end for scanning, and having another end rigidly supported in a cantilevered fashion;
   electrically conductive means rigidly attached to said fiber and extending from said unsupported end to said supported end;
   a transparent conductive plate lying in a plane perpendicular to the length of said fiber and spaced apart from said unsupported end to form a capacitance C with said conductive means;
   a voltage source V coupled between said transparent conductive plate and said electrically conductive means on said fiber to thereby produce an electrostatic charge Q on said conductive means near said movable end where $Q=VC$; and
   means for generating an electric field E transverse to the length of said fiber to position said movable end with a force $F=QE$.

2. A fiber optic scanning device according to claim 1, wherein said electrically conductive means is a continuous metal film.

3. A fiber optic scanning device according to claim 2, wherein said film is formed by vacuum deposition and covers only approximately 50% of said fiber.

4. A fiber optic scanning device according to claim 1, wherein said transparent conductive plate is comprised of a glass substrate with a transparent conductive film disposed thereon.

5. A fiber optic scanning device according to claim 4, wherein said film consists of tin oxide.

6. A fiber optic scanning device according to claim 1, wherein said means for generating includes one pair of spaced apart conductive plates lying parallel to the length of said fiber with said fiber lying therebetween.

7. A fiber optic scanning device according to claim 6, wherein said means for generating further includes another pair of spaced apart conductive plates lying parallel to the length of said fiber and perpendicular to said one pair of spaced apart conductive plates with said fiber lying therebetween.

8. In a fiber optic scanning device containing an optical fiber having one unsupported end for scanning, and having another end rigidly supported in a cantilevered fashion, a method of positioning said movable end including the steps of:
   rigidly attaching an electrically conductive means to said fiber extending from said unsupported end to said supported end;
   providing a transparent conductive plate in a plane perpencidular to the length of said fiber and spaced apart from said unsupported end to form a capacitance C with said conductive means;
   coupling a voltage source V between said transparent conductive plate and said electrically conductive means on said fiber to thereby produce an electrostatic charge Q on said conductive means near said movable end where $Q=VC$; and
   generating an electric field E transverse to the length of said fiber to position said movable end with a force $F=QE$.

* * * * *